(12) United States Patent
Claiborne

(10) Patent No.: US 6,462,833 B1
(45) Date of Patent: Oct. 8, 2002

(54) IMAGE PROCESSOR WITH CONDITIONAL BIT MAP STORE

(75) Inventor: Steven J. Claiborne, Meridian, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/258,097

(22) Filed: Feb. 25, 1999

(51) Int. Cl.[7] ................................................. G06K 1/00
(52) U.S. Cl. ....................... 358/1.16; 358/1.1; 358/1.13; 358/404; 358/444
(58) Field of Search ............................... 358/1.13, 1.16, 358/1.15, 1.1, 1.9, 1.18, 1.17, 1.14, 1.11, 404, 444

(56) References Cited

U.S. PATENT DOCUMENTS

| | | | |
|---|---|---|---|
| 5,717,840 A | * | 2/1998 | Pardo ........................ 358/1.13 |
| 5,930,469 A | * | 7/1999 | Chiarabini et al. ........ 358/1.17 |
| 6,166,827 A | * | 12/2000 | Campbell et al. .......... 358/1.17 |

* cited by examiner

*Primary Examiner*—Mark Wallerson
*Assistant Examiner*—Twyler Lamb

(57) ABSTRACT

An imaging system includes a processor and memory for storing descriptions of images. Such images include mosaic patterns that recur in a larger image. When the larger image is displayed, the mosaic patterns are tiled to fill defined areas of the larger image. If a description of a mosaic pattern in terms of graphics primitives would occupy more memory than a description of the mosaic pattern in a bit map format, then the processor converts the image description to a bit map format, stores the result in the memory, and releases the portion of the memory formerly used for storage of the graphics primitives. Otherwise, the processor delays such a conversion until the bit map is needed for tiling.

20 Claims, 4 Drawing Sheets

| PDL GRAPHICS ELEMENTS | |
|---|---|
| ROUNDED RECTANGLE | |
| ELLIPSE | |
| POLYGON | |
| CLIP PATH | |
| COMPLEX TEXT | TEXT |
| FILL | |
| STROKE | |

FIG. 4

| GL GRAPHICS PRIMATIVES | |
|---|---|
| TRAPEZOID | |
| RECTANGLE | |
| XLINE | — |
| YLINE | \| |
| SIMPLE TEXT | text |

FIG. 5

IMAGE PROCESSOR WITH CONDITIONAL BIT MAP STORE

FIELD OF THE INVENTION

Embodiments of the present invention relate to methods of storing image data in memory during image processing and to systems that perform such methods.

BACKGROUND OF THE INVENTION

A conventional laser printer generally includes a print engine, an input interface for receiving data to be printed, and a processor that supplies data to the print engine in response to the received input data. The processor manages a modest internal memory for buffering input data, for translating input data to provide a signal for the print engine, and for paper jam recovery. The input data conventionally includes instructions conforming to a page description language (PDL), such as PCL printer control language, marketed by Hewlett Packard, or the POSTSCRIPT page description language, marketed by Adobe Systems. PCL and POSTSCRIPT are trademarks of the respective aforementioned companies. Some input data in a PDL format may require temporary storage in the printer to facilitate operation on such input data as a whole. In the process of providing a signal to the print engine, input data in a PDL format is conventionally translated to a bit map format. Data in a bit map format may also require temporary storage in the printer to facilitate producing a scan signal to the print engine. When a portion of an image in a bit map format is needed more than once on the same page, memory management routines conventionally require temporary storage of the repeated bit map data for access at different times. Paper jam recovery is an attractive feature of a printer that operates as a page printer. A page printer prints respective pages on sequential separate sheets of paper. Such a printer maintains a complete description of each page until the sheet for that page exits the printer. If a paper jam should arise before the sheet exits the printer, the page is reprinted as soon as the jam is cleared without the printer receiving again the input data in a PDL format.

The market for printers imposes economic constraints that limit the amount of memory available to the processor for the functions discussed above and other communication and image processing tasks. In addition, demand for low cost, high throughput, high resolution page printers continues to increase. A continuous high throughput page printing rate is difficult to achieve with an economically limited memory size. The page printing rate degrades when processing is stopped by a memory-out condition. Such a condition can arise when an excessive amount of data in a bit map format is being retained. The page printing rate may also be degraded when data in a bit map format is discarded (to free memory demanded for other purposes and then recreated when next needed. In this later case, processing time increases to produce the image to be printed. Such processing time directly degrades the page printing rate.

The interruption in processing or increased processing described above may have adverse effects on the computer system to which such a printer is connected. For example, an interruption in processing may interrupt network communication between a computer and the printer. Delays in transmission of input data and/or retransmission of incompletely processed input data consumes network resources and computing resources that may otherwise have been effectively applied to other purposes of the computer system.

In view of the problems described above and related problems that consequently become apparent in the art of image processing systems, the need remains for methods and apparatus for managing memory used for image processing.

SUMMARY OF THE INVENTION

An imaging system according to an embodiment of the present invention includes a memory and a processor. The processor performs a method for managing utilization of the memory. The method includes the following steps in any order: (a) forming a decomposition of provided graphic elements where the decomposition includes graphic primitives and the decomposition occupies a first portion of the memory; (b) determining an estimate of a system resource utilization that would be incurred with a step of rendering; (c) determining in accordance with the estimate, whether to postpone performance of the step of rendering; and (d) rendering the graphic primitives to form bit map data that occupies a second portion of the memory, thereby permitting reuse of the first portion of the memory.

By forming a decomposition of the image in graphic primitives, an estimate of memory utilization and/or processor utilization may be used to defer rendering when immediate rendering would consequently commit more memory to storing the rendered result or involve more processing time. System performance improves. In a printer such system performance includes increased ability to print complex images, faster page printing rate, and the ability meet such printing performance goals with less memory.

When the graphic primitives are of a variety of types, calculating the estimated amount of memory as a sum of a first expression in accordance with a first type and a second expression in accordance with a second type provides a more accurate estimate of system resource utilization, especially memory utilization.

In a variation, the step of determining the estimate further includes the following steps in any order: (e) determining an estimated amount of memory for the second portion; (f) forming a difference between a size of the first portion and the estimated amount of memory for the second portion; and (g) if the difference exceeds a predetermined threshold value, proceeding to perform the step of determining whether to postpone; and otherwise determining the estimate in accordance with a processing duration associated with the step of rendering.

By determining whether to postpone rendering on the basis of memory utilization, a calculation of processing duration may be avoided for those cases where a difference in memory utilization is significant.

Another embodiment according to various aspects of the present invention, provides a printer which includes an interface, a processor, and a print engine. The interface receives a first description of a page to be printed. The first description conforms to a page description language. The processor performs a method that includes the following steps in any order: (a) deriving a second description of a portion of the page from a portion of the first description; (b) assessing a processor resource utilization with respect to deriving from the second description a third description in a bit map format of the portion of the page; (c) deriving the third description when storage of the third description instead of the second description would improve the resource utilization; and (d) deriving scan line data from the third description. The print engine prints the page in accordance with the scan line data.

By improving the processor resource utilization, for example, as in reducing memory requirements during processing of a page, a printer with a limited amount of memory can print more complex pages and sustain a faster page printing rate. Use of the present invention in a printer allows memory not used for bit map storage to be used for any other purpose and so generally improves printer capability.

In yet another embodiment, a processor is formed on an integrated circuit substrate to perform a method including the following steps in any order: (a) receiving a first description of a tile; (b) deriving a second description of the tile, the second description for storage in a portion of provided memory; (c) assessing a resource utilization with respect to deriving from the second description a third description in a bit map format of the tile; and (d) deriving the third description when storage in the memory of the third description instead of the second description would improve the resource utilization.

BRIEF DESCRIPTION OF THE DRAWING

Embodiments of the present invention will now be further described with reference to the drawing, wherein like designations denote like elements, and:

FIG. 4 is a chart of representative PDL graphics elements; and

FIG. 5 is a chart of representative GL graphics primitives.

DETAILED DESCRIPTION OF PREFERRED EMBODIMENTS

According to aspects of the present invention, image processing systems vary in complexity for serving a wide range of applications, such as physical monitoring and measurement, special purpose data analysis, process control, printing, plotting, image recording, and image display, to name a few representative examples. Such systems have an internal functional architecture that includes a processor (e.g., a state machine or a central processing unit), a read/write memory (e.g., RAM) having a limited size, a program storage memory (e.g., ROM) having a limited size, and an imaging output device, for example a memory, a display, or a print engine. These functional elements are coupled in a conventional manner for retrieving processing instructions and/or constants from the ROM, performing image processing operations by the processor, to effect temporary data storage in RAM and/or to produce signals used by the imaging output device.

Figure 1:
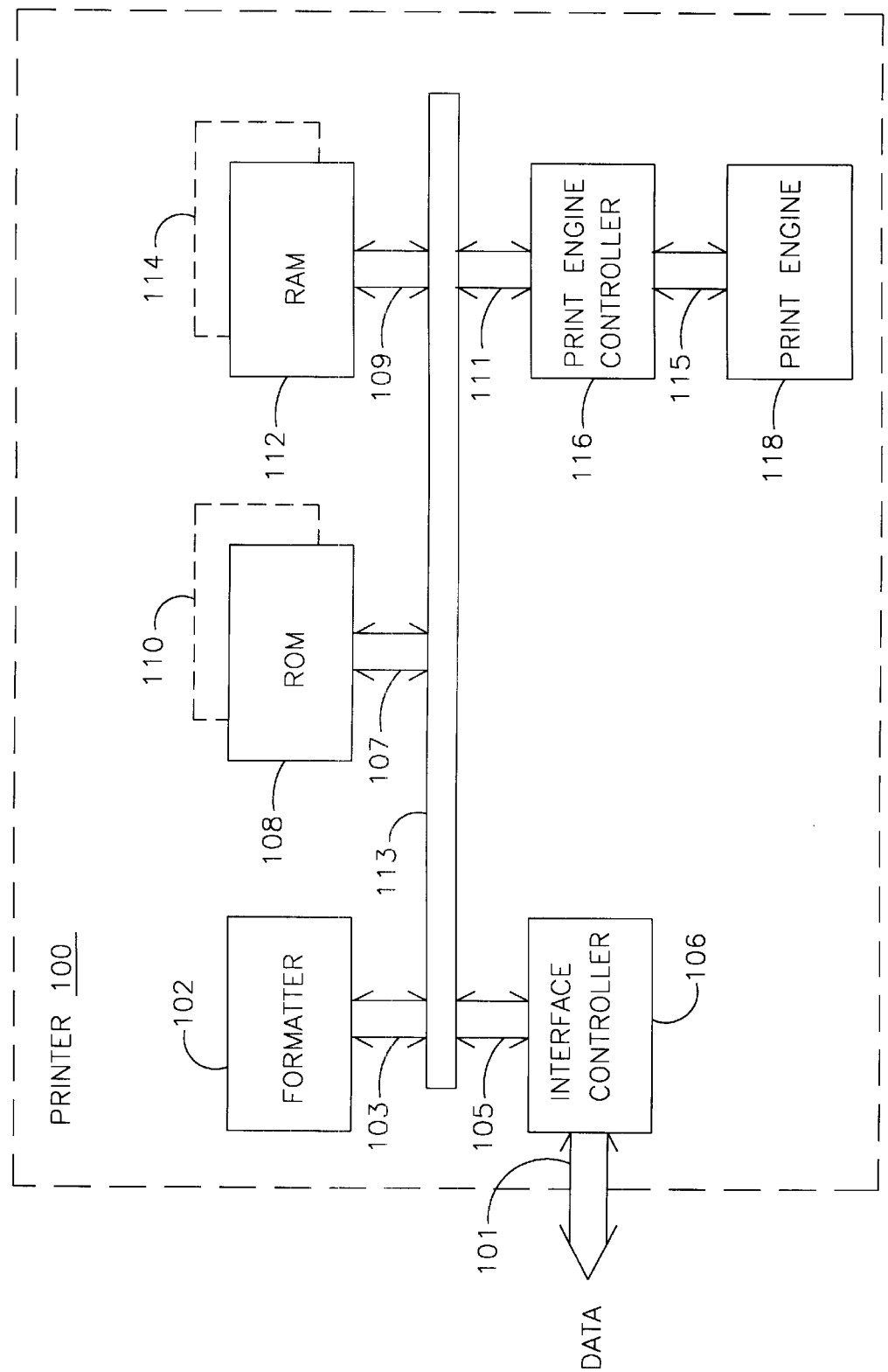
FIG. 1 is a functional block diagram of a printer according various aspects of the present invention.

An imaging system according to various aspects of the present invention includes any computer system or peripheral having a processor and memory that cooperate to perform an image processing function. For example, a computer system having a computer, a graphic display, and a network for the exchange of data between the computer and the display may operate as an imaging system exclusively or in addition to other functions. Printer 100 of FIG. 1 is another example of an imaging system, on a smaller scale. A computer (not shown) uses printer 100 as a peripheral. The computer describes an image to be printed using commands of a conventional page description language (PDL) conveyed by signal DATA on line 101. Printer 100 primarily includes interface controller 106, bus 113, formatter 102, ROM 108, RAM 112, print engine controller 116, and print engine 118 and is suitably constructed according to conventional mechanical, electronic, and software technology, except as described below.

An interface controller includes any conventional circuit for performing a messaging protocol in hardware and/or software (or firmware). For example, interface 106 receives into a buffer memory data conveyed by signal DATA on line 101 describing an image; and, by supporting a conventional interface protocol, determines information to be passed to formatter 102 via lines 105, 103, and bus 113. Interface controller 106 also responds to commands (e.g., related to an interface protocol) from formatter 102 and provides status and control information also by a suitable signal (not shown), also on line 101.

A print engine includes any conventional printing apparatus (e.g., of the type using an ink jet device or a laser printing device) that is responsive to a signal for recording text and/or graphics on media (e.g., paper or photographic film). For example, print engine 118 includes a conventional monochrome or color laser print engine. When print engine 118 includes a raster printing device, data in scan 10 line format is determined by formatter 102 and passed via conventional lines 103, 111, 115, bus 113, and print engine controller 116, to print engine 118 for printing.

A print engine controller may include any digital and/or analog circuitry for supplying data and control signals to a print engine. For example, print engine controller 116 receives from formatter 103 commands and data that direct printing by print engine 118. Print engine controller 116 provides signals on line 115 to control print engine 118 and responds to status signals from print engine 118 on line 115. Status information is communicated by print engine controller 116 to formatter 102 in a conventional manner. An alternate print engine controller includes direct memory access (DMA) circuitry that reads data from ROM 108 and/or RAM 112 to be printed and writes status to RAM 112 without intervention by formatter 102. An alternate formatter includes such DMA circuitry.

Memory used in printer 100 includes any combination of conventional read/write and read only memory circuitry and provides storage for variables and software (including fixed data items and program instructions). For example, printer 100 includes RAM 112, expandable with RAM 114, for storage of variables; and includes ROM 108, expandable with ROM 110. ROM 108 provides economical storage for a large amount of built-in software including fixed data items (e.g. fonts) and programs. Some or all of the built-in software may be stored in a compressed format. Any conventional memory circuitry may be used to implement ROM 108 and 112 including static mask ROM, electrically erasable programmable memory devices, and battery-backed dynamic random access memory devices, to name a few common types. RAM 112 provides storage for data and may include a portion of software in compressed or uncompressed format. In operation, downloaded software from interface controller 106 may be stored in RAM 112 in compressed or uncompressed format. RAM 112 provides temporary storage between any operations of image processing. For example, RAM 112 may store input data received on line 101 in a PDL format, image data in a conventional graphics language (GL) format, image data in a bit map format, and/or page buffers for paper jam recovery.

A processor according to various aspects of the present invention may include any digital computer circuit that provides image data in accordance with an assessment of cost associated with storing image data in a selected format.

Printer 100 includes a processor that additionally performs the functions of a formatter and may in alternate variations perform the functions of an interface controller and/or print engine controller, as discussed above. A formatter controls and coordinates nearly all functions of a printer and formats received data into scan lines for a print engine. For example, Formatter 102 formats data received from interface controller 106 into scan lines provided to print engine controller 116. Formatter 102 performs program instructions that have been stored in ROM 108 (or 110) or in RAM 112 (or 114). In a variation, additional special purpose digital computer circuits may be coupled to bus 113 for additional or improved computational capability, process monitoring, or print engine control. Conventional computing circuits for executing a stored program include microprocessor-based and microcontroller-based circuits of the type conventionally implemented on printed circuit boards or on an application specific integrated circuit (ASIC). In a variation, a processor of the present invention is implemented as an ASIC or ASIC chip set.

Figure 2:
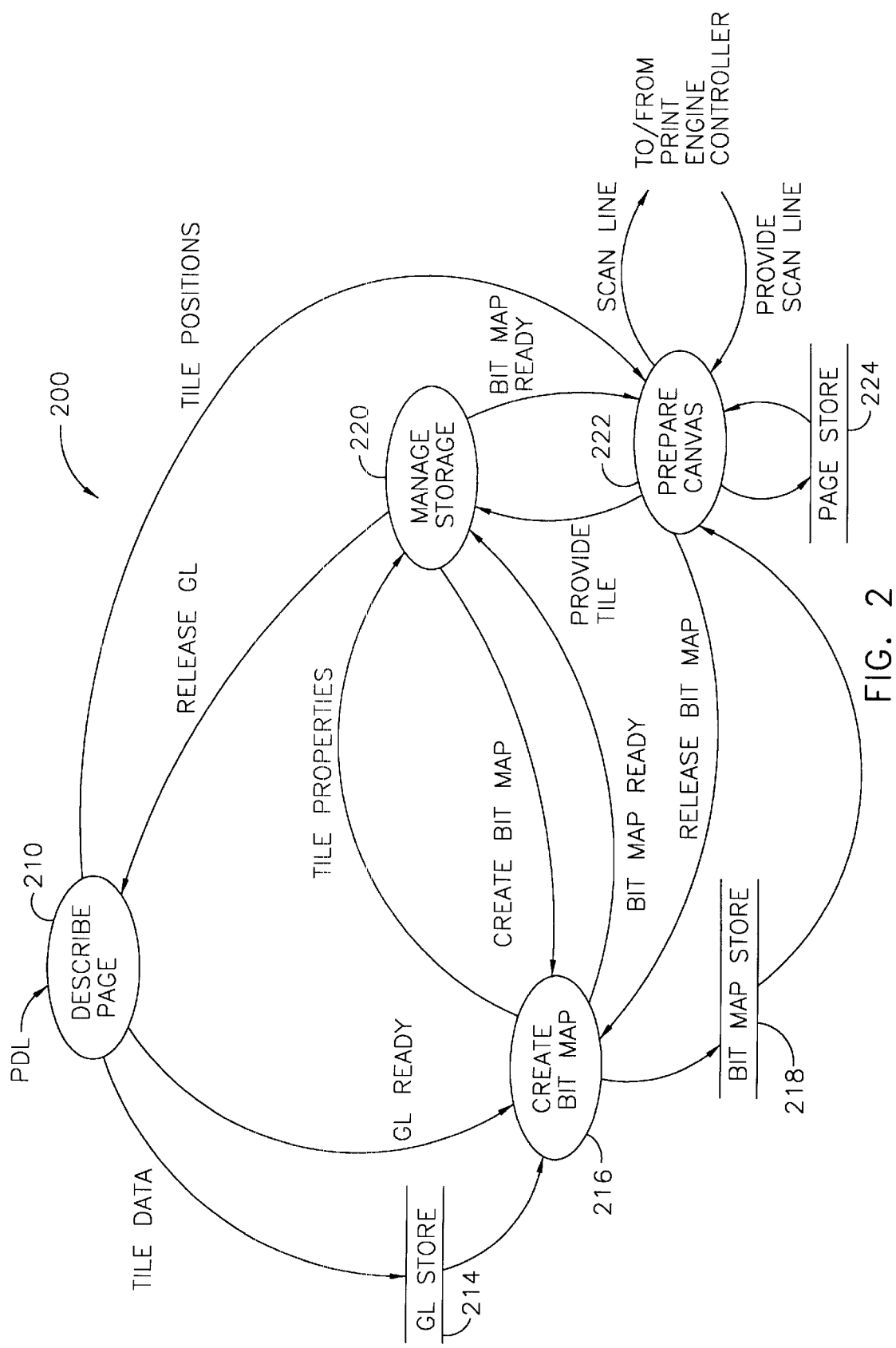
FIG. 2 is a data flow diagram of image processing performed by the printer of FIG. 1.

A method of image processing, according to various aspects of the present invention includes any sequence of operations or combination of multitasking processes that accomplish the functions of a processor as described above. For example, imaging process 200 of FIG. 2, executed by formatter 102, includes four tasks operating in parallel in response to intertask messages. In a variation, one or more of these tasks may be implemented with a circuit that receives and provides signals to convey information equivalent to intertask messages discussed below.

Imaging process 200 includes task 210 for describing a page, task 216 for creating bit map data, task 220 for managing storage of image data, and task 222 for preparing a canvas and providing scan lines to print engine controller 116. Messages between tasks shown in FIG. 2 may include structures or pointers to structures for example of the type described in Table 1 or may include any other suitable memory utilization as defined in any conventional programming language.

For describing a page, task 210 receives input data in a PDL format and determines (primarily from the PDL syntax and/or semantics), among other things, data that represents a tile to be used one or more times in creating the printed image on a page. A tile includes any bounded region of an image. Tiles may have any size and may overlap in a manner that appears to be transparent, opaque, or translucent when printed. A tile may include text and/or graphic imagery.

On receipt of data describing a tile, task 210 develops a description of the tile using syntax and semantics of a conventional graphic language. Tile Data includes graphics primitives corresponding to tiles and other aspects of the image for the page. Tile Data is stored in graphics language (GL) format in GL store 214. The position(s) of each primitive (or group of primitives, for example a tile) are described in Tile Positions passed to task 222. Exemplary input data (in PCL format), Tile Data information, and Tile Position information are set out below in Table 1.

TABLE 1

| PCL | Tile Data | Tile Position |
|---|---|---|
| //Define a diamond shaped tile at<br>//(x,y) = (2000,2000)<br>ubyte 10 FirstMosaic<br>BeginMosaic<br>NewPath<br>sint 16_xy 2000 2000 Point<br>SetCursor<br>unit16 4 NumberOfPoints<br>ubyte eSint16 PointType<br>LineRelpath<br>//Embedded Data Follows<br>dataLengthByte 16<br>sint16_raw*<br>(1000 1000 -1000<br>1006-1000-1000 1000-1000)<br>EndMosaic | enum {<br>trapezoid,<br>rectangle,<br>Xline,<br>Yline<br>} PrimitiveType;<br>struct {<br>PrimitiveType pt;<br>int TopLeftX,<br>TopRightx,<br>BottomRightx,<br>BottomLeftX,<br>} prim;<br>primpos pp1 =<br>TopY, BottomY;<br>//Decomposition<br>provides two<br>//graphics primitives: two<br>//trapezoids, each<br>one defining<br>//a triangle portion<br>of half of<br>//the diamond shape<br>prim prim1 =<br>{trapezoid, 2000,<br>2000, 3000, 1000, 2000,<br>3000}<br>prim prim2 = {trapezoid,<br>1000, 3000, 2000, 2000,<br>3000, 4000} | struct {<br>prim* prims;<br>primpos* pps;<br>} tile;<br>struct {<br>prim p;<br>prim* next;<br>} prims;<br>struct {<br>int XPos;<br>int YPos;<br>primpos* next;<br>} primpos;<br>primpos pp2 =<br>{2000,<br>2000};<br>primpos pp2 =<br>{1000,<br>3000};<br>tile t1 =<br>{<br>{prim1,<br>prim2,<br>null},<br>{pp1,<br>pp2,<br>null}<br>}; |
| //Define a rectangular area to be<br>//filled with the diamond shaped<br>//tile defined above.<br>//top left (x,y) = (1000,1000)<br>//bottom right (x,y) = (9000,9000)<br>ubyte 10 FirstBox<br>SetBrushSource FirstMosaic<br>sint16 box 1000 1000 9000 9000 BoundingBox<br>SetPenWidth 228<br>RectanglePath<br>Paintpath | //decomposition provides<br>//a rectangle for<br>each border<br>//with thickness is 228<br>//top border<br>prim prim3 =<br>{rectangle, 1000,<br>0, 9000, 0, 1000, 1228};<br>//right border<br>prim prim4 =<br>{rectangle, 8772,<br>0, 9000, 0, 1000, 9000};<br>//bottom border<br>prim prim5 =<br>{rectangle, 1000,<br>0, 9000, 0, 8772, 9000};<br>//left border<br>prim prim6 =<br>{rectangle, 1000,<br>0, 1228, 0, 1000, 9000}; | primpos pp3 =<br>{1000,<br>1000};<br>primpos pp4 =<br>{8772,<br>1000};<br>primpos pp5 =<br>{1000,<br>primpos pp6 =<br>{1000<br>1000};<br>tile t2 =<br>{prim3,<br>prim4,<br>prim5,<br>prim6,<br>null},<br>{pp3,<br>pp4,<br>pp5,<br>pp6,<br>null}; |

In Table 1 row 1, a description of a diamond shaped image is provided first in PCL format as such a description might be received. In the second and third columns, exemplary data structures in the C programming language define the memory utilization for tile data and tile position and give an example of values corresponding to the diamond shaped tile. In the second row, the image description corresponds to a rectangle having stoked borders and filled with the diamond shaped tile of the first row. Each border stroke is represented in the second column as a rectangle.

For ease of description, the example of Table 1 is greatly simplified in a number of respects. Table 1 illustrates only one graphic element, namely a stroked rectangle. A page description language may include any number of elements, some examples of which are shown in FIG. 4. Many page description languages also include bit map image data as an element. In a more typical image definition, the PDL description may contain tens of tile descriptions of a wide mix of element types for a single page. The graphics language may include any number of primitives, some examples of which are shown in FIG. 5. Many graphics languages also include bit map image data as a primitive.

Further, only the simplest representation of a stoked border is set out in Table 1. A representation of borders that meet at a corner may include additional trapezoids, XLines, Ylines, and rectangles for improving the appearance of the corner at various orientations to the pixel grid that defines the image of a page.

Decomposition includes any method of representing a graphics element by one or more graphics primitives. Task 210 performs decomposition in any suitable manner as illustrated for example by the second and third columns of Table 1. Each tile description resulting from decomposition is stored in GL store 214. GL store 214 may be implemented as an allocated portion of RAM 112. When a tile description has been completed, a GL Ready message alerts task 216.

On receipt of a GL Ready message, task 216 makes an assessment of system resource utilization prior to rendering image data into a bit map format. A system resource includes any limited or budgeted capability of an imaging system, for example the extent of memory allocations, processing durations (e.g., CPU cycles), communication traffic (e.g., on bus 113), power consumption, heat generation, etc. Such an assessment may include evaluation of the known state of system resources and may include estimates of system resource utilization associated with tasks yet to be performed. For example, the system resource utilization associated with storage of a particular portion of image data in a GL format includes the size (i.e., number of addresses) of the portion of memory that has been allocated for such storage. The system resource utilization associated with rendering such image data from a GL format into a bit map format may include an estimated memory utilization and an estimated processor utilization.

An estimate of memory utilization for bit map storage may be calculated, according to various aspects of the present invention, in accordance with a result of a decomposition. For example, the number of pixels included in a graphics primitive may directly correspond to an amount of memory needed to store a representation of that primitive in a bit map format. When a graphics primitive is defined as a filled image, such an amount may be calculated as a product of the area of the primitive, expressed as an integer number of pixels, and the amount of memory for defining the color and properties (e.g., transparency, translucency) of the filler. Tile Data as discussed above includes geometric points on an X-Y grid having integer grid spacing. Each unit of such a grid corresponds to one pixel. Suitable conventional geometric expressions may be used for each type of graphics primitive to determine its included area. For example, Xlines and Ylines may be defined as having a line weight of one pixel and no included area. Simple text may be defined as fixed pitch character codes so that the area taken up by such text may correspond to the number of character positions of the text as stored in a suitable string.

Processing duration in a first variation is estimated as a multiple of the estimated amount of memory for the image data in a bit map format. The factor used in such a multiple is determined from analysis of the instruction execution durations that may be required to write each pixel as bit map data. In a second variation, processing duration estimates compensate for differences between types and sizes of graphics primitives. For example, an estimate may include a linear expression for a class of graphics primitives. Such a linear expression may include a slope and an offset obtained by empirical analysis of average processing duration. For example, image processing durations may be measured for a large number of graphic primitives of varying sizes and types in a battery of tests. An analysis of the results of such testing may reveal groups of graphic primitives having processing duration within convenient ranges. By defining such a group as a class and associating a processing duration range with the class, further testing may reveal other graphic primitives that are members of the class. Any number of classes may be defined. Improved accuracy of the estimate of processing duration may result from defining an increasing number of classes.

In a case where several graphics primitives together correspond to a single tile, as for example two trapezoids for the diamond shaped tile discussed above with reference to Table 1, the assessment is determined as a sum of the assessment of each contributing graphics primitive. When graphics primitives of several types are to be combined in one assessment, the assessment is determined as a sum of the respective expressions used for each graphics primitive.

The results of the assessment of system resource utilization are provided to task 220 as a Tile Properties message. Such a message may be in any suitable format and may include the size of memory occupied by a particular tile data description in GL store 214, the amount of memory that may be needed to store image data in a bit map format that corresponds to such tile data, and/or an estimate of processing duration expected to be spent rendering graphics primitives from GL store 214 to form such bit map data.

On receipt of a Tile Properties message, task 220 determines in what format the respective tile is to be stored. Such a determination may be made in any manner suitable for conserving a system resource. When utilization of a system resource is avoided or decreased, system resource utilization is said to be improved. For example, in a first variation, memory utilization and processing duration are combined in a weighted sum. If the sum exceeds a predetermined minimum value, the cost in terms of the system resource utilization of immediately rendering a GL format to a bit map format is deferred by postponing rendering. Constants used as weights for such a weighted sum may be determined by empirical methods as discussed above.

In a second variation, task 216 first provides only an assessment of memory utilization to task 220. Task 220, may determine that the rendering operation may be postponed when memory utilization for the bit map data exceeds a predetermined maximum value. When memory utilization by itself is not determinative, task 220 requests an estimate of processing duration and determines whether to postpone rendering on the basis of a comparison of processing duration to a predetermined maximum.

In an alternate variation, task 220 compares the memory utilization for a GL format with the memory utilization for a bit map format. If a difference between the size of the memory allocated for data in a GL format and the amount of memory estimated to be used for corresponding data in a bit map format exceeds a predetermined maximum, rendering is postponed. In a preferred version of such an alternative, if the difference is greater than zero, rendering is postponed because, even if the memory allocated for data in a GL format is freed for other use (e.g., bit map data storage), increased memory utilization cannot be outweighed by processor utilization that may be avoided if rendering were not postponed. Such processor utilization may include for example, generation and dispatching of one or more Create Bit Map message discussed below.

When task 220 determines that rendering is to be postponed, the tile description remains stored in GL store 214 in a GL format. Otherwise, a Create Bit Map message is immediately (or shortly) provided to task 216. Task 216 then renders the GL data by generating image data in a bit map format for the respective tile described in GL store 214. On completion of rendering, task 216 notifies task 220 with a Bit Map Ready message and stores the generated result in bit map store 218. The bit map description may occupy an allocated portion of RAM 112.

Because rendering may combine information from several graphics primitives, a conservation of memory utilization may be more likely to occur when several bit map primitives are combined with or without other primitives. This result is readily apparent when primitives overlap in an opaque manner.

When a complete page description has been received by task 210, and all related Tile Position messages have consequently been passed to task 222, task 222 may begin developing as much of the description of the image to be printed as needed for provision of sequential scan line messages (or signals). Image data in page store 224 is generally in a bit map format. In a preferred variation, the description of the image for an entire page is developed by Prepare Canvas task 222 and stored in page store 224. In an alternate variation, tiles are added to page store 224 in an order that permits scan line messages to be provided when only a portion of the image for an entire page has been developed. In yet another variation, portions of more than one page (or multiple color planes of one or more pages) are developed and stored in page store 224. According to the variations just mentioned, provision of scan line messages may begin when all color planes are complete or when a portion of one or more is sufficiently complete.

In a variation where tiles are demanded as needed, task 222 responds to Provide Scan Line messages from print engine controller 116, determines identifiers for tiles that are needed for the respective position of the requested scan line in the image to be printed, and sends one or more Provide Tile messages to task 220. Task 220 determines, for example by table look up or by the structure of the tile identifier, which format was determined to be economical for storage of the requested tile. For a tile that has been stored in a GL format (i.e., rendering has been postponed until now), manage storage task 220 provides a Create Bit Map message to Create Bit Map task 216. Task 216 reads GL store 214, creates tile image data in a bit map format, and stores this data in bit map store 218 in a manner as discussed above. Task 216 then provides Bit Map Ready message to task 220 which relays the Bit Map Ready message to task 222. Task 222 then retrieves image data for the requested tile from bit map store 218. On the other hand, when tile storage had been determined to be economical in a bit map format, task 220 immediately responds with a Bit Map Ready message to task 222 and task 222 retrieves image data as discussed above to satisfy its request. Prepare canvas task 222 may then perform any combination of the conventional calculations and image (or tile) processing operations to rotate, position, scale, crop, margin adjust, overlay, fill, edge-enhance, and render as halftone(s) to develop the requested scan line message.

Figure 3:
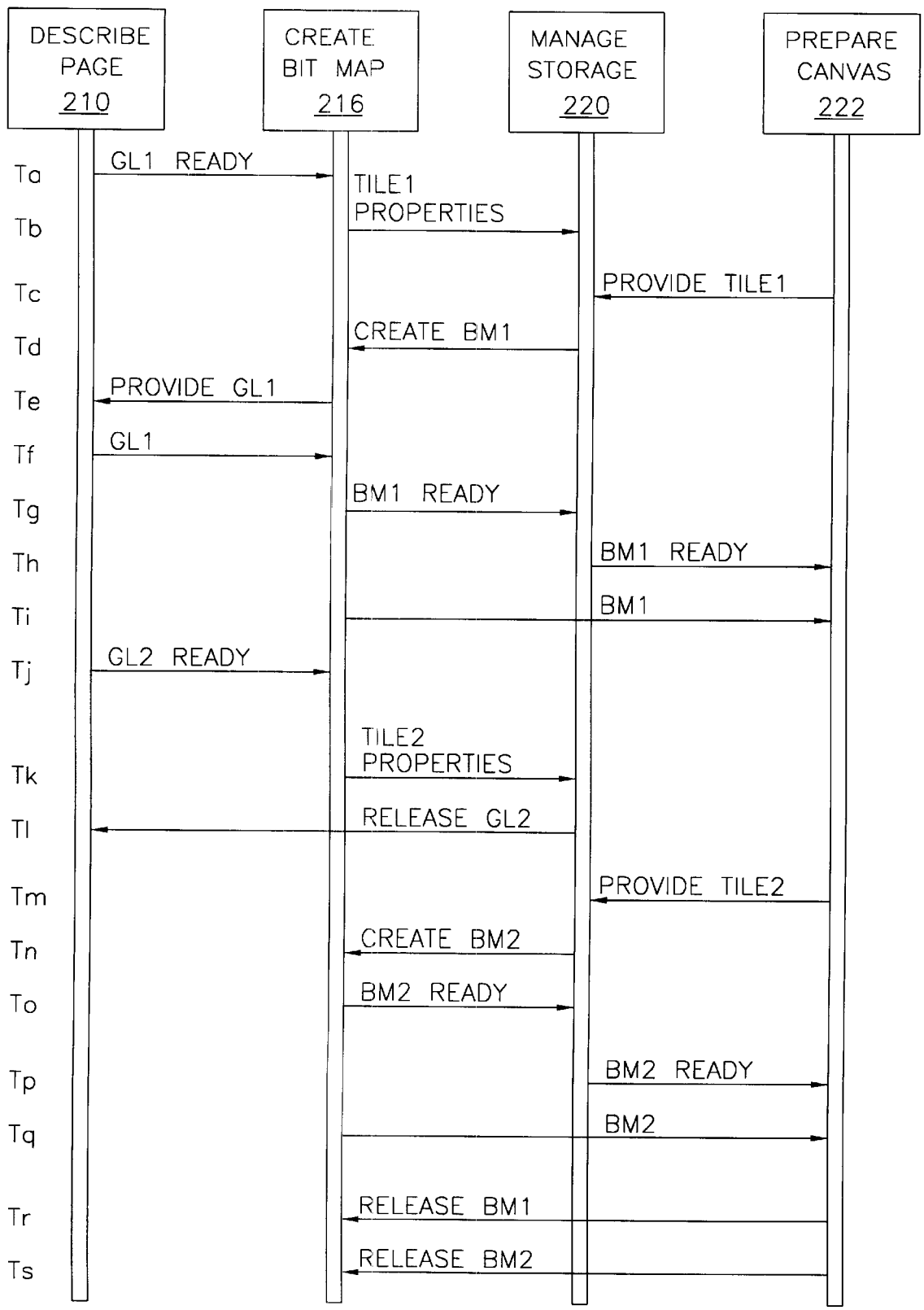
FIG. 3 is a sequence diagram of image processing events in an example of image processing according to FIG. 2.

Cooperation of tasks 210, 216, 220, and 222 may be better understood with reference to a sequence of operations described in FIG. 3. The diagram is read from top to bottom with the time of particular events indicated on the left. The duration between events is not indicated. Two sequences are illustrated in an order selected for convenience of description. Of course, input data in a PDL format may be of any complexity and consequently image data for consecutive tiles may be in any combination of the formats discussed above. Messages and image data are indicated with the digit '1' or '2' as applicable to a first tile used in the first sequence and to a second tile used in the second sequence.

In the first sequence from time $T_a$ to time $T_i$, image data for tile 1 is provided from storage in a GL format. At time $T_a$ task 210 provides a GL Ready message to task 216 with respect to tile 1. At time $T_b$ task 216 provides a Tile Properties message with respect to tile 1 to task 220. At time $T_c$ task 222 requests tile 1 by sending a Provide Tile message with respect to tile 1 to task 220. At time $T_d$ task 220 provides a Create Bit Map message with respect to tile 1 to task 216. At time $T_e$ and $T_f$ task 216 requests and obtains image data for tile 1 in a GL format from task 210. As here, messages may be used to accomplish access to GL store 214; or, in the variation discussed above, task 216 may have direct access to GL store 214. At times $T_g$ and $T_h$ Bit Map Ready messages are conveyed from task 216 through task 220 to task 222. At time $T_i$ task 222 accesses image data for tile 1 in a bit map format from bit map store 218. In an alternate variation, messages between tasks 222 and 216 are used to provide access to such data.

In the second sequence from time $T_j$ to time $T_s$, image data for tile 2 is provided from storage in a bit map format. At time $T_j$ task 210 provides a GL Ready message to task 216 with respect to tile 2. At time $T_k$ task 216 provides a Tile Properties message with respect to tile 2 to task 220. At time $T_l$ task 220 provides a Release GL message with respect to tile 2 to task 210. Task 210 may free storage space allocated in GL store 214 for tile 2 because Manage Storage task 220 has determined that storage in Bit Map store 218 should be used instead. At time $T_m$ task 222 requests tile 2 by sending a Provide Tile message with respect to tile 2 to task 220. At time $T_n$ task 220 provides a Create Bit Map message with respect to tile 2 to task 216. At times $T_o$ and $T_p$ Bit Map Ready messages are conveyed from task 216 through task 220 to task 222. At time $T_q$ task 222 accesses image data for tile 2 in a bit map format from bit map store 218. In an alternate variation, messages between tasks 222 and 220 are used to provide access to such data.

At any time that image data for a tile in a bit map format is no longer needed for canvas preparation or for paper jam recovery, task 222 provides a Release Bit Map message to task 216. Task 216 may free storage space allocated in bit map store 218 that had been used for the respective tile identified in the message. For example, at times $T_r$ and $T_s$ task 222 provides Release Bit Map messages identifying image data for tiles 1 and 2 respectively.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. An imaging system comprising:
   (a) a memory; and
   (b) a processor that performs a method for managing utilization of the memory, the method comprising:
      forming a decomposition of provided graphic elements, the decomposition comprising graphic primitives, the decomposition occupying a first portion of the memory;
      determining an estimate of a system resource utilization that would be incurred with a step of rendering;
      determining in accordance with the estimate, whether to postpone performance of the step of rendering; and
      rendering the graphic primitives to form bit map data occupying a second portion of the memory thereby permitting reuse of the first portion of the memory.

2. The system of claim 1 wherein determining the estimate further comprises determining an estimated amount of memory for the second portion.

3. The system of claim 2 wherein:
(a) the graphics primitives comprise a first graphic primitive of a first type and a second graphic primitive of a second type; and
(b) the estimated amount of memory is calculated as a sum of a first expression in accordance with the first type and a second expression in accordance with the second type.

4. The system of claim 3 wherein determining the estimate further comprises determining a processing duration associated with the step of rendering.

5. The system of claim 4 wherein the processing duration is calculated as a sum of a third expression in accordance with the first type and a fourth expression determined in accordance with the second type.

6. The system of claim 2 wherein determining whether to postpone further comprises comparing a size of the first portion with the estimated amount of memory for the second portion.

7. The system of claim 1 wherein the step of determining the estimate further comprises:
determining an estimated amount of memory for the second portion;
forming a difference between a size of the first portion and the estimated amount of memory for the second portion; and
if the difference exceeds a predetermined threshold value, proceeding to perform the step of determining whether to postpone; and otherwise determining the estimate in accordance with a processing duration associated with the step of rendering.

8. A printer comprising:
(a) an interface for receiving a first description of a page to be printed, the first description conforming to a page description language;
(b) a processor that performs a method comprising:
deriving a second description of a portion of the page from a portion of the first description;
assessing a processor resource utilization with respect to deriving from the second description a third description in bit map format of the portion of the page;
deriving the third description when storage of the third description instead of the second description would improve the resource utilization; and
deriving scan line data from the third description; and
(c) a print engine that prints the page in accordance with the scan line data.

9. The printer of claim 8 wherein:
(a) the processor comprises a memory for storage of the second description and the third description; and
(b) the resource utilization comprises a utilization of the memory.

10. The printer of claim 8 wherein the resource utilization comprises a duration of processing with respect to the step of deriving the third description.

11. The printer of claim 8 wherein the second description conforms to a graphics language comprising graphics primitives.

12. The printer of claim 8 wherein:
(a) the portion of the first description defines a tile; and
(b) the portion of the page described by the second description recurs on the page.

13. The printer of claim 12 wherein the third description is derived only once.

14. A processor, formed on an integrated circuit substrate, that performs a method comprising:
receiving a first description of a tile;
deriving a second description of the tile, the second description for storage in a portion of provided memory;
assessing a resource utilization with respect to deriving from the second description a third description in bit map format of the tile; and
deriving the third description when storage in the memory of the third description instead of the second description would improve the resource utilization.

15. The processor of claim 14 wherein the resource utilization comprises a utilization of the memory.

16. The processor of claim 14 wherein the resource comprises a utilization of the memory and a processor duration with respect to deriving the third description.

17. The processor of claim 14 wherein the second description conforms to a graphics language comprising graphics primitives.

18. The processor of claim 17 wherein:
(a) the first description comprises graphic elements;
(b) deriving the second description comprises forming a decomposition of the graphic elements, the decomposition comprising graphic primitives; and
(c) assessing the resource utilization comprises determining an estimated amount of memory for the third description.

19. The processor of claim 18 wherein:
(a) the graphics primitives comprise a first graphic primitive of a first type and a second graphic primitive of a second type; and
(b) the estimated amount of memory is calculated as a sum of a first expression in accordance with the first type and a second expression in accordance with the second type.

20. The processor of claim 14 wherein the step of assessing further comprises:
determining an estimated amount of memory for the third description;
forming a difference between a size of the first portion and the estimated amount of memory for the third description; and
if the difference exceeds a predetermined threshold value, proceeding to perform the step of determining the third description; and otherwise assessing the resource utilization in accordance with a processing duration associated with the step of determining the third description.

* * * * *

UNITED STATES PATENT AND TRADEMARK OFFICE
CERTIFICATE OF CORRECTION

PATENT NO. : 6,462,833 B1  
DATED : October 8, 2002  
INVENTOR(S) : Claiborne

Page 1 of 1

It is certified that error appears in the above-identified patent and that said Letters Patent is hereby corrected as shown below:

<u>Column 5, lines 60-67 and Column 6, lines 1-44,</u>  
Please delete the entire Table I and replace it with the following Table I:

| PCL | Tile Data | Tile Position |
|---|---|---|
| //Define a diamond shaped tile at<br>//(x,y) = (2000, 2000)<br>ubyte 10 FirstMosaic<br>BeginMosaic<br>NewPath<br>sint16_xy 2000 2000 Point<br>SetCursor<br>uint16 4 NumberOfPoints<br>ubyte eSInt16 PointType<br>LineRelPath<br>//Embedded Data Follows<br>dataLengthByte 16<br>sint16_raw* (1000 1000 -1000<br>  1000 -1000 -1000 1000 -1000)<br>EndMosaic | enum {<br>  trapezoid,<br>  rectangle,<br>  Xline,<br>  Yline<br>} PrimitiveType;<br><br>struct {<br>PrimitiveType pt;<br>int TopLeftX, TopRightX,<br>BottomRightX, BottomLeftX,<br>TopY, BottomY;<br>} prim;<br><br>//Decomposition provides two<br>//graphics primitives: two<br>//trapezoids, each one defining<br>//a triangle portion of half of<br>//the diamond shape<br>prim prim1 = {trapezoid, 2000,<br>2000, 3000, 1000, 2000,<br>3000}<br>prim prim2 = {trapezoid,<br>1000, 3000, 2000, 2000,<br>3000, 4000} | struct {<br>prim* prims;<br>primpos* pps;<br>} tile;<br><br>struct {<br>prim p;<br>prim* next;<br>} prims;<br><br>struct {<br>int XPos;<br>int YPos;<br>primpos* next;<br>} primpos;<br><br>primpos pp1 =<br>  {2000,<br>  2000};<br><br>primpos pp2 =<br>  {1000,<br>  3000};<br><br>tile t1 =<br>{<br>  {prim1,<br>  prim2,<br>  null},<br>  {pp1,<br>  pp2,<br>  null}<br>}; |
| //Define a rectangular area to be<br>//filled with the diamond shaped<br>//tile defined above.<br>//top left (x,y) = (1000,1000)<br>//bottom right (x,y) = (9000,9000)<br>ubyte 10 FirstBox<br>SetBrushSource FirstMosaic<br>sint16_box 1000 1000 9000<br>  9000 BoundingBox<br>SetPenWidth 228<br>RectanglePath<br>Paintpath | //decomposition provides<br>//a rectangle for each border<br>//with thickness is 228<br>//top border<br>prim prim3 = {rectangle, 1000,<br>0, 9000, 0, 1000, 1228};<br>//right border<br>prim prim4 = {rectangle, 8772,<br>0, 9000, 0, 1000, 9000};<br>//bottom border<br>prim prim5 = {rectangle, 1000,<br>0, 9000, 0, 8772, 9000};<br>//left border<br>prim prim6 = {rectangle, 1000,<br>0. 1228, 0, 1000, 9000}; | primpos pp3 =<br>  {1000,<br>  1000};<br>primpos pp4 =<br>  {8772,<br>  1000};<br>primpos pp5 =<br>  {1000,<br>  8772};<br>primpos pp6 =<br>  {1000,<br>  1000};<br>tile t2 =<br>  { prim3,<br>  prim4,<br>  prim5,<br>  prim6,<br>  null},<br>  {pp3,<br>  pp4,<br>  pp5,<br>  pp6,<br>  null}; |

Table 1

Signed and Sealed this

Fourth Day of November, 2003

JAMES E. ROGAN  
*Director of the United States Patent and Trademark Office*